United States Patent
Hirschberg et al.

(10) Patent No.: US 11,905,178 B2
(45) Date of Patent: Feb. 20, 2024

(54) CONVERTING FLUORINATED MATERIALS INTO ANHYDROUS HYDROGEN FLUORIDE

(71) Applicant: 3M INNOVATIVE PROPERTIES COMPANY, St. Paul, MN (US)

(72) Inventors: Markus E. Hirschberg, Mühldorf (DE); Klaus Hintzer, Kastl (DE); Thomas W. Schoettle, Wanghausen (AT); Arne Thaler, Emmerting (DE); Achim Schmidt-Rodenkirchen, Bayreuth (DE); Thorsten Gerdes, Eckersdorf (DE); Konstantin Mierdel, Bayreuth (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/254,671

(22) PCT Filed: Dec. 14, 2021

(86) PCT No.: PCT/IB2021/061721
§ 371 (c)(1),
(2) Date: May 26, 2023

(87) PCT Pub. No.: WO2022/130212
PCT Pub. Date: Jun. 23, 2022

(65) Prior Publication Data
US 2024/0002228 A1    Jan. 4, 2024

Related U.S. Application Data

(60) Provisional application No. 63/125,807, filed on Dec. 15, 2020.

(51) Int. Cl.
C01B 7/19    (2006.01)
C01B 32/50   (2017.01)
C01B 32/40   (2017.01)

(52) U.S. Cl.
CPC .............. *C01B 7/196* (2013.01); *C01B 32/40* (2017.08); *C01B 32/50* (2017.08)

(58) Field of Classification Search
CPC .......... C01B 7/196; C01B 32/50; C01B 32/40
(Continued)

(56) References Cited

U.S. PATENT DOCUMENTS 2,519,983 A    8/1950  Simons
4,310,501 A    1/1982  Reh et al.
(Continued)

FOREIGN PATENT DOCUMENTS

DE    3112455 A1    10/1982
RU    2601007 C2    10/2016
(Continued)

OTHER PUBLICATIONS

Hunt, "Microwave-Specific Enhancement of the Carbon-Carbon Dioxide (Bourdouard) Reaction", 2013, Journal of Physical Chemistry, vol. 117, pp. 26871-26880, XP002761224.
(Continued)

*Primary Examiner* — Douglas B Call
(74) *Attorney, Agent, or Firm* — Thomas M. Spielbauer

(57) ABSTRACT

Methods of converting a variety of fluorinated materials into anhydrous hydrogen fluoride are described. The methods include thermally decomposing the fluorinated materials into a gaseous effluent comprising hydrogen fluoride and carbon dioxide. This gaseous effluent is then treated with carbon at a temperature of at least 830° C., converting the carbon dioxide to carbon monoxide (CO) and producing a gaseous product comprising the hydrogen fluoride, which can be condensed to generate anhydrous hydrogen fluoride. These methods can also be used to convert water contained in the gaseous effluent into hydrogen.

16 Claims, 3 Drawing Sheets

(58) Field of Classification Search
USPC .......................................................... 423/484
See application file for complete search history.

(56) References Cited

U.S. PATENT DOCUMENTS

| | | |
|---|---|---|
| 5,322,597 A | 6/1994 | Childs et al. |
| 8,344,190 B2 | 1/2013 | Hintzer et al. |
| 9,764,963 B2 | 9/2017 | Zipplies et al. |
| 11,155,464 B2 | 10/2021 | Pashkevich et al. |
| 2011/0184214 A1 | 7/2011 | Hintzer et al. |
| 2019/0276329 A1 | 9/2019 | Zipplies et al. |

FOREIGN PATENT DOCUMENTS

| | | |
|---|---|---|
| WO | 1998050603 A1 | 11/1998 |
| WO | 2018222073 A1 | 12/2018 |

OTHER PUBLICATIONS

International Search Report received for PCT International Application No. PCT/IB2021/061721, dated Mar. 10, 2022, 5 pages.
Kapustin, "Stability of Hydrogen Fluoride under Water-Gas-Reaction Conditions", Jul. 2019, Journal of Engineering Physics and Thermophysics, pp. 889-898, XP36879225.

… … …

CONVERTING FLUORINATED MATERIALS INTO ANHYDROUS HYDROGEN FLUORIDE

CROSS REFERENCE TO RELATED APPLICATIONS

This application is a national stage filing under 35 U.S.C. 371 of PCT/IB2021/061721, filed 14 Dec. 2021, which claims the benefit of U.S. Application No. 63/125,807, filed 15 Dec. 2020, the disclosure of which is incorporated by reference in its/their entirety herein.

FIELD

The present disclosure relates to methods for converting fluorinated materials directly into anhydrous hydrogen fluoride. The methods include thermally decomposing the fluorinated materials and treating the resulting gaseous effluent with carbon at high temperatures.

SUMMARY

Briefly, in one aspect, the present disclosure provides methods of generating anhydrous hydrogen fluoride comprising thermally decomposing a fluorinated material into a gaseous effluent comprising hydrogen fluoride and carbon dioxide, and contacting the gaseous effluent with carbon at a temperature of at least 830° C. to convert the carbon dioxide to carbon monoxide and produce a gaseous product comprising the hydrogen fluoride and carbon monoxide. If the gaseous product further comprises carbon dioxide, a molar ratio of carbon dioxide to carbon monoxide is no greater than 0.05. The hydrogen fluoride from the gaseous product can then be condensed to form liquid anhydrous hydrogen fluoride.

In some embodiments, the gaseous effluent further comprises water vapor and contacting the gaseous effluent with carbon converts at least 99 wt. % of the water to hydrogen and carbon monoxide.

In some embodiments, microwave radiation may be used to thermally decompose the fluorinated material, to treat the gaseous effluent with carbon, or both.

DETAILED DESCRIPTION

Figure 1:
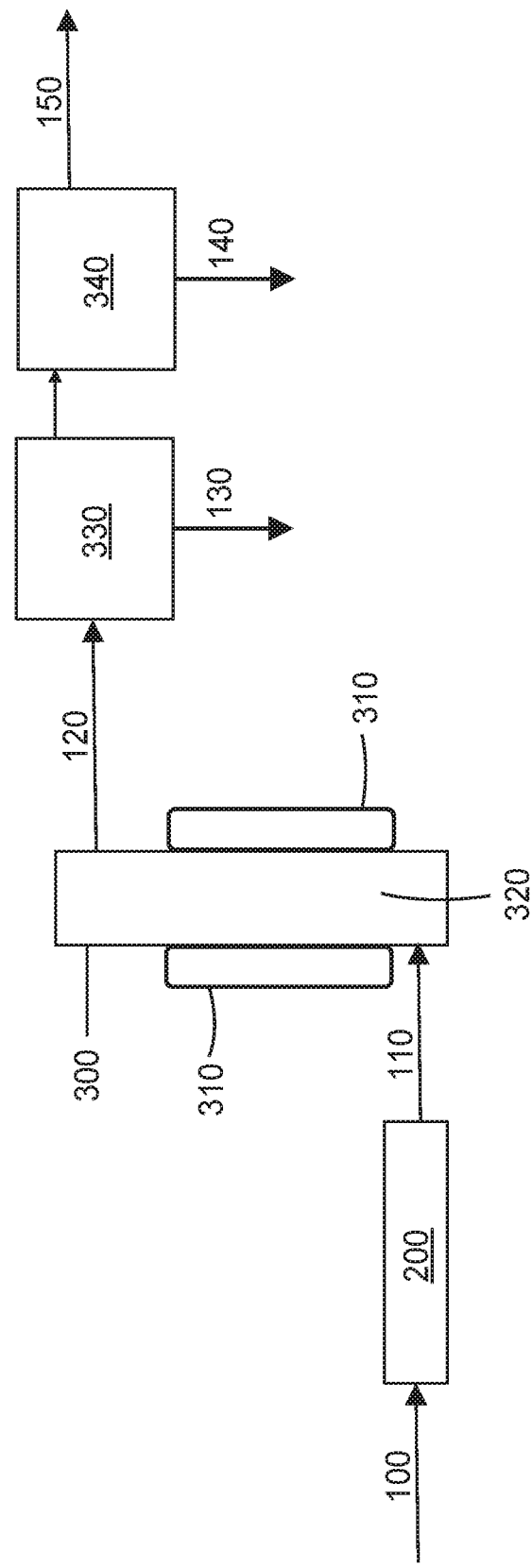
FIG. 1 is a block diagram of the process steps for converting fluorinated materials in anhydrous HF according to some embodiments of the present disclosure.

Fluorinated polymers are used in a wide variety of applications. Perfluorinated polymers are particularly useful in demanding applications including those that require high temperature stability or chemical resistance. However, these properties make recycling challenging. The presence of common fillers such as inorganic fibers (e.g., glass or carbon fibers), carbon, metals and ceramics can make recycling even more difficult. As a result, fluorinated materials, particularly filled perfluorinated polymers and laminates, may require costly disposal methods.

Generally, fluorinated materials can be produced by polymerizing one or more partially fluorinated or perfluorinated monomers, optionally with one or more non-fluorinated monomers. Anhydrous hydrogen fluoride (aHF; purity >99 wt. %) is used to form commonly used fluorinated monomers. For example, TFE and HFP can be produced by the pyrolysis of chloro(difluoro)methane (R22) made from trichloromethane and aHF at temperatures of 600 to 1000° C. AHF is also a key starting material for other fluorine containing monomers such as, e.g., vinylidene difluoride (VDF), vinyl fluoride (VF), or chlorotrifluoroethylene (CTFE). Generally, fluorinated materials (e.g., fluids and fluorine containing gases) can also be produced by electrochemical fluorination reactions using aHF.

In industrial settings, HF is derived from the reaction of concentrated sulfuric acid with fluorspar ($CaF_2$). Generally, the fluorspar must be mined and pulverized before reacting it with highly concentrated sulfuric acid. The reaction proceeds at a controlled temperature to produce hydrogen fluoride gas and calcium sulfate. In view of the costs and environmental impact of mining fluorspar, alternative methods of generating calcium fluoride have been developed. Such methods have included reacting aqueous solutions or gases containing HF with calcium salts such as calcium carbonate to form calcium fluoride ($CaF_2$) particles.

Co-owned U.S. Pat. No. 9,764,963 (Zipplies et al.) describes wet processes in which dilute aqueous solutions of HF are reacted with calcium salts to produce free-flowing particles. Co-owned U.S. Patent Application No. 2019/0276329 (Zipplies et al.) describes dry processes in which HF in a gas stream is reacted with calcium carbonate particles in a fluidized bed reactor to produce calcium fluoride particles. While both the wet and dry processes avoid the need to mine fluorspar, they generate $CaF_2$ that still must be reacted with highly concentrated sulfuric acid under controlled conditions to generate the desired anhydrous HF.

RU 2601007 C2 ("Method of Extracting Hydrogen Fluoride from Aqueous Solutions") describes a process for extracting anhydrous HF from aqueous solutions of HF (i.e., hydrofluoric acid). The methods are said to comprise bringing a pre-evaporated or sprayed mixture of hydrogen fluoride and water into contact with carbon, heated to over 1000 K, in a weight ratio of water to carbon of 1:0.5 to 1:2. The produced gaseous hydrogen fluoride and any remaining water vapor are condensed and rectified to extract anhydrous hydrogen fluoride. Any remaining azeotropic mixture of HF and water can be recycled. WO 2018222073A1 ("Method of Producing Hydrogen Fluoride from Aqueous Solutions Thereof") describes a similar process in which an aqueous solution of HF is treated with a reducing agent at high temperatures. Suitable reducing agents are described as liquid or gaseous, unsaturated, aromatic hydrocarbons, oxygen-containing organic compounds, their isomers, and mixtures thereof.

There remains a need for alternative sources of anhydrous HF. In particular, there is a desire to find processes that do not rely on the intermediate generation of calcium fluoride and the associated processes needed to convert it into aHF. As hydrogen fluoride and water form an azeotropic mixture, methods that do not rely on distillation and can deliver high yields of aHF are also desired. Also, methods that can process a wide variety of fluoride sources, including fluorinated gases, fluorinated liquids, and fluorinated solids such as partially and fully fluorinated polymers and oligomers can be advantageous.

The present disclosure provides methods wherein fluorinated materials, including partially and fully fluorinated polymers, can be converted directly into aHF. In addition to providing a cost-effective alternative source of aHF, in some embodiments, such methods can be used to recycle in-process fluorinated waste materials and post-use fluorinated products, included those filled with or contaminated by nonfluorinated materials.

Generally, these methods include a thermal decomposition step and a carbon treatment step, which may be run consecutively or with one or more intervening steps. Each step may be run continuously or batchwise.

In the thermal decomposition step, a fluorinated material is decomposed in the presence of oxygen at high temperatures to generate a gaseous effluent stream. Generally, if the ratio of H/F in the feed material is less than one, the gaseous effluent stream contains HF and carbon dioxide ($CO_2$). In some embodiments, the gaseous effluent may also include carbon monoxide (CO).

In the carbon treatment step, this gaseous effluent is treated with carbon at high temperatures to produce a gaseous product stream containing the HF and CO,

$$HF + CO_2 + C_{(s)} \rightarrow HF + CO/CO_2 \quad (I).$$

In some embodiments, a hydrogen-donor (e.g., methane, natural gas) may be added in the thermal decomposition step to achieve an H/F ratio of one or more. If the ratio of H/F in the feed material is greater than one, the gaseous effluent stream will contain water vapor ($H_2O$) in addition to HF and $CO_2$. In addition, or alternatively, $H_2O$ may be added directly to the gaseous effluent stream prior to or during the carbon treatment step. When water vapor is present in the gaseous effluent stream, hydrogen gas ($H_2$) is also be generated in the carbon treatment step, e.g.,

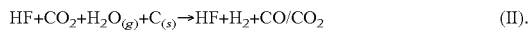

$$HF + CO_2 + H_2O_{(g)} + C_{(s)} \rightarrow HF + H_2 + CO/CO_2 \quad (II).$$

Depending on the reaction conditions, $CO_2$ may remain in the gaseous product stream or even be generated during the carbon treatment step. For example, CO can react with water to form $CO_2$ and $H_2$ (watergas shift reaction; WGSR), or $CO_2$ can react with $H_2$ to carbon and water (Bosch reaction). Based on these different reaction possibilities, one can influence the ratio of $CO_2$, CO and $H_2$. However, it is generally desirable to select reaction conditions that will result in in very high to complete conversion of $CO_2$ into CO. In some embodiments, the amount of $CO_2$ in the gaseous product stream will be below the detection limits. If $CO_2$ is present in the gaseous product stream, the molar ratio of carbon dioxide to carbon monoxide is no greater than 0.05, e.g., no greater than 0.02, or even no greater than 0.01.

Regardless of the other components present, the HF in this gaseous product steam may then be condensed to form liquid anhydrous hydrogen fluoride having a water content of no greater than 1 wt. %. In some embodiments, a water content is less than 1000 ppm, e.g., less than 500, less than 100 or even less than 50 ppm by weight.

Generally, the fluorinated material being processed is not critical. Suitable fluorinated materials include fluoropolymers, compositions comprising fluoropolymers, and fluoropolymer containing articles. The material may include one or more fluorinated gases, fluorinated liquids and fluorinated solids. In some embodiments, the fluorinated material includes one or more partially fluorinated or perfluorinated polymers. Fluorinated materials also include gaseous or liquid fluorine containing low molecular weight compounds, such as for example by-products from the electrochemical fluorination of alkanes.

Generally, fluorinated organic compounds of low molecular weight have a molecular weight of less than about 1,000 g/mol. They may be solid, liquid or gaseous at room temperature (25° C.). The compounds contain fluorine and carbon but are not limited thereto and may, for example also contain hydrogen, nitrogen, chlorine and/or bromine. Preferably, the compounds have a (molar) fluorine content of at least 25% more preferably at least 50%. The compounds may further include functional groups e.g. (per)fluoro alkane sulfonic, carbonic acids and their derivatives. Typical examples of fluorinated organic compounds of low molecular weight include, but are not limited to, $CF_4$, $C_2F_6$, fluorinated or polyfluorinated butanes, such as, for example fluorinated cyclobutane, R22 ($CH_2F_2$), R134 ($C_2H_2F_4$), R227 ($C_3HF_7$), OIME (($CF_3)_2CH—CF_2—O—CH_3$) and mixtures thereof. Typically, fluorinated organic compounds of low molecular weight or mixtures can be generated by the fluorination of hydrocarbons, for example through electrochemical fluorination in electrochemical cells as, for example, described in U.S. Pat. Nos. 2,519,983, 5,322,597 or International Publication Number WO 98/50603.

The feedstock for the fluorination process generally comprises linear or branched hydrocarbons or partially fluorinated hydrocarbons. A particular feedstock includes crude oil or petroleum fractions, so-called distillation cuts originating from making olefins such as ethylene or propylene. Typically, hydrocarbons or hydrocarbon containing mixtures have a boiling point below 200° C. or below 150° C., or below 100° C. Fluorinated organic compounds of low molecular weight or mixtures can also be obtained by the exchange of chloride against fluoride.

Fluoropolymers are polymers having a fluorinated backbone. The fluoropolymers may contain repeating units derived from fluorinated olefins such as, for example, tetrafluoroethylene (TFE), hexafluoropropylene (HFP), vinylidene fluoride (VDF), chlorotrifluoroethylene (CTFE), perfluorinated or partially fluorinated alkylvinyl ethers, alkylalkoxy vinyl ethers, alkylallyl ether and alkylalkoxy allyl ethers. Examples of perfluorovinyl ethers include those that correspond to the formula: $CF_2=CF—O—Rf$ wherein Rf represents a perfluorinated, linear, cyclic or branched aliphatic group that may contain one or more oxygen atoms. Examples of perfluoroallyl ethers include those that correspond to the formula: $CF_2=CF—CF_2—O-Rf$ wherein Rf represents a perfluorinated, linear, cyclic or branched aliphatic group that may contain one or more oxygen atoms. The fluoropolymers may also contain repeating units derived from non-fluorinated olefins, such as $C_2$-$C_8$ olefins, for example, ethylene (E) or propylene (P). Typical examples of fluoropolymers include, but are not limited to, homopolymers and copolymers of tetrafluoroethylene, polymers containing repeating units derived from TFE and HFP; TFE, HFP and VDF; TFE and CTFE; TFE, CTFE and E or P; TFE, E and HFP; CTFE and E or P; and combinations or blends thereof. The fluoropolymers may be present as pure polymers, or mixtures of polymers.

Fluorinated ionomers (i.e., fluoropolymers containing a plurality of $—SO_3^-$ or $—CO_2^-$ groups as pending and or terminal groups) may also be used as the fluorinated material in the processes of the present disclosure. Typically, such ionomers are used in the preparation of membranes in fuel cells or electrochemical processes.

Compositions comprising fluoropolymers include, for example, so-called "fluoropolymer compounds", which are fluoropolymers, or polymer blends containing fluoropolymers, further containing hydrocarbon polymers and other additives such as, for example, fillers, pigments, lubricants, curing agents, curing accelerators, thermal or electrical conducting materials etc. Laminates may also be used as the fluorinated material in the processes of the present disclosure. Such fluorinated materials include fluoropolymers laminated with polyolefins (e.g., polypropylene and polyethylene), polyesters, polyvinylchlorides, amides, imides, rubbers, and silicones. Generally, such compositions comprise at least 5 wt. % fluorinated material, e.g., at least 10%, at least 25% or even at least 50 wt. %. Materials with low fluorinated materials include post-consumer waste e.g., hoses, coated films and fabrics, and clothing.

The fluorinated materials may be pre-treated prior to subjecting them to the thermal decomposition processes described herein. Such pre-treatment may involve the separation of fluoropolymer-containing materials from non-fluoropolymer containing materials, removal of oil or dirt etc. or a fluorination step, where the polymers are treated with $F_2$-gas to convert hydrogen bonds into C—F bonds.

A block diagram of one exemplary process flow sequence is shown in FIG. 1. Fluorinated material 100 is fed into thermal decomposition reactor 200. The fluorinated materials may be fed into the thermal decomposition process in any desired manner. Liquids may be introduced, for example through spraying or may be vaporized into gases. Gaseous fluorinated materials may be introduced as separate gas streams, as carrier gas streams or as reaction medium. Solid fluorinated materials (e.g., fluoropolymers or fluoropolymer-containing compositions) may be fed in particulate form. For example, such solids may be converted into particulate form, for example, by milling or grinding devices known in the art, e.g., prior to the thermal decomposition step. In some embodiments, the solid fluoropolymer particles have a weight average maximum dimension (e.g., length or diameter) of from 50 μm to 100 mm, e.g., 100 μm to 10 mm, or even from 500 μm to 1000 μm. Such solid particles may be fed into the reactor, for example, through gravity feed. To assist in feeding, free-flowing particles may be preferred.

Methods of thermally decomposing such fluorinated materials to form gaseous HF are well-known. Such methods include incinerating the fluorinated materials e.g., by autothermic reactions or by a flame, or by an incinerating system as applied in common burners that run on natural gas or oxyhydrogen mixtures ($H_2/O_2$).

In some embodiments, the fluorinated material is decomposed by being subjected to microwave irradiation as described in, e.g., U.S. Pat. No. 8,344,190. Microwave irradiation as referred to herein means irradiation with electromagnetic waves having a wavelength of about 30 cm to about 3 mm and/or a frequency band of from about 300 MHz to about 300 GHz, preferably from about 915 MHz to about 2.45 GHz. The microwaves may be generated by devices known in the art including, for example, diodes, magnetrons, gyrotrons, travelling wave tubes, klystrons, ubitrons, and amplitrons. Generally, any suitable microwave heating system may be used.

Typically, microwave active materials heat up by at least 10° C. when 1 g of the microwave active material is subjected to microwave irradiation at a frequency of 915 MHz to 2.45 GHz for 5 minutes at ambient conditions. In some embodiments, the microwave active material heats up by at least 20° C., e.g., at least 30° C. Microwave active particles include particles comprising carbon, graphite, carbides, borides, nitrides, metal oxides, metal hydroxides, metal halides, in particular metal chlorides, metal fluorides, boron carbides, titanium carbides, zirconium carbides, titanium borides, sodium chloride, magnesium chlorides, potassium chloride, cobalt fluorides, potassium fluoride, calcium fluorides etc. including mixtures and combinations thereof.

In some embodiments, the microwave active particles are selected from the group consisting of graphite, carbon, coal and combinations thereof.

The microwave active particles are preferably chosen such that they do not react with the reaction mixture and lose their microwave activity. The microwave active particles may be used as combinations or blends of different microwave active particles. The optimum size and amounts of the particles may be adapted to the specific composition of the fluorinated materials and the configuration of the reactor and the conditions at which the process is run. Typically, the particles have an average particle size (number average) of from about 100 μm to about 5 mm, preferably from about 250 μm to about 2 mm. The particles may be spherical or non-spherical. In case of spherical or substantially spherical particles the average size is determined by measuring the average diameter. In case of non-spherical particles, such as, for example, needle-like particles, the longest dimension (here the length) will be used for determining the particle size.

The ratio of microwave active particles to fluorinated material to be decomposed depends on the reactor type, dimension and configuration. Typically, the weight ratio of microwave active particles to material to be decomposed is from about 1:1,000 to about 1:0.1; preferably from about 1:10 to about 1:1. Some of the microwave particles may be removed from the reactor, for example by the carrier gas stream or lost through abrasion, and may have to be replaced. This can be done by continuous or discontinuous feeding. The microwave active particles may, for example, be present in the carrier gas or reaction medium or fluidized bed. This means the microwave active particles are in a mobile phase during the decomposition reaction. They may be introduced into the reactor through auxiliary gas streams simultaneously or non-simultaneously with the fluorinated material, or they may be present in the reactor before the fluorinated material is introduced into reactor. The microwave active particles may also be added to the fluorinated material for example before, during or after the fluorinated material is fed into the reactor, or more specifically into the decomposition zone. Alternatively, the microwave-active particles may also be present in an immobile phase (fixed bed) during the decomposition reaction, for example, in the same or similar way as catalytic beds. During the decomposition of the fluorinated compounds, heating by microwave active materials can be more efficient compared to external heating systems as well as to incineration by a flame with e.g., methane, natural gas, or $H_2/O_2$. In cases where only oxygen is introduced to decompose the fluorinated material, the amount of $CO_2$ will also be reduced.

The design of thermal decomposition reactor 200 will depend on the method selected for decomposition, and any known reactor design may be used. However, as HF gas will be generated, the materials and design should be selected for the compatibility with this highly corrosive material. Suitable materials include austenitic steel (1.4841; 1.4571), hastelloy, or other suitable nickel-based alloys can be used. Fluoropolymer sealings, e.g., PTFE of VDF seals, should also be considered.

Generally, the fluorinated materials are decomposed at temperatures ($T_D$) of at least 500° C., e.g., at least 700° C. In some embodiments, the fluorinated materials are decomposed at temperatures, $T_D$, of below 1200° C., e.g., below 1000° C.

In some embodiments, the hot effluent gases 110 from the thermal decomposition step experience little or no cooling prior to being contacted with the carbon in the carbon treatment step. For example, in some embodiments, the effluent temperature is no less than 100° C., e.g., no less than 50° C. below the decomposition temperature. However, in some embodiments, intervening steps may lower the temperature of the effluent prior to contact with the carbon.

As used herein, $T_E$ refers to the temperature of the effluent gases when contacted with the carbon in the carbon treatment step. To assist in controlling the composition of the gases resulting from the carbon treatment step, including the relative amounts of CO and $CO_2$, in some embodiments, $T_E$ is at least 300° C., e.g., at least 500° C., or even at least 700° C.

In the carbon treatment step, the HF-containing effluent gas 110 of the thermal decomposition step is treated with carbon in the combustion chamber 320 of carbon treatment reactor 300. For example, the effluent gas can be passed over or through layers of carbon. The carbon treatment step is performed at high temperature to convert the $CO_2$ to CO. If present in the HF-containing effluent gas 110, the carbon treatment step also reduces water vapor to $H_2$.

Generally, at higher temperatures, thermodynamics favors the formation of CO in the disproportionation of 2 CO into $CO_2$ and C, or its reverse (the Boudouard Reaction). At lower temperatures, more $CO_2$ is generated, which would typically be released as a waste stream, potentially leading to environmental impacts or costly carbon taxes. It may be desirable to generate CO as it can be captured and used in other operations rather than being released to the atmosphere. Therefore, the carbon treatment temperature ($T_C$) is at least 830° C. (about 1100 K) both to increase the ratio of CO to $CO_2$ produced and to ensure very high to complete conversion of the $H_2O$ into $H_2$ and CO. In some embodiments, the carbon treatment temperature is at least 1000° C., e.g., at least 1200° C. Generally, $T_C$ is no greater than 2000° C., e.g., no greater than 1800° C. In some embodiments, at least 99 wt. %, e.g., at least 99.5 or even at least 99.9 wt. % of the $H_2O$ is converted into $H_2$ and CO.

These high treatment temperatures may be obtained by introducing oxygen into the carbon zone. However, this will consume carbon and generate additional CO and $CO_2$. Therefore, in some embodiments, the carbon reaction zone can be heated to the desired temperatures through the use of, e.g., an external heater 310, in an oven, by exposure to microwaves, or other means or combinations of such. With such approaches, temperatures of up to about 2000° C. can be achieved without excessive consumption of the carbon or the risk of introducing contaminants.

The use of microwave heating of the carbon offers several advantages. For example, temperature gradients and localized hot and cold spots can be reduced relative to other heating methods such as combustion of the carbon with oxygen, ovens, and external heaters. Microwave technology can also provide greater process reliability, because by switching the microwave on or off, the reactor can either be brought up to high operating temperature or down to a safe operating state in the shortest possible time. Although some autothermal combustion may still occur, such consumption of carbon can be reduced or eliminated by the use of microwave technology. Generally, the carbon material used for the treatment of the combustion gases should have low levels of volatile compounds (e.g., mass loss at 700° C. of less than 10 wt. % preferably less than 5 wt. %) and additionally the carbon should have low amounts of residuals and ash contents. Furthermore, the carbon is selected that manner in that the reactivity of $CO_2$ and water is high to avoid high reaction temperatures for the conversion of $CO_2$ and water.

As certain carbon particles themselves are microwave active, microwave heating can be used without requiring the addition of other microwave active materials. However, optionally, additional microwave active materials may be included in the carbon bed.

Figure 2:
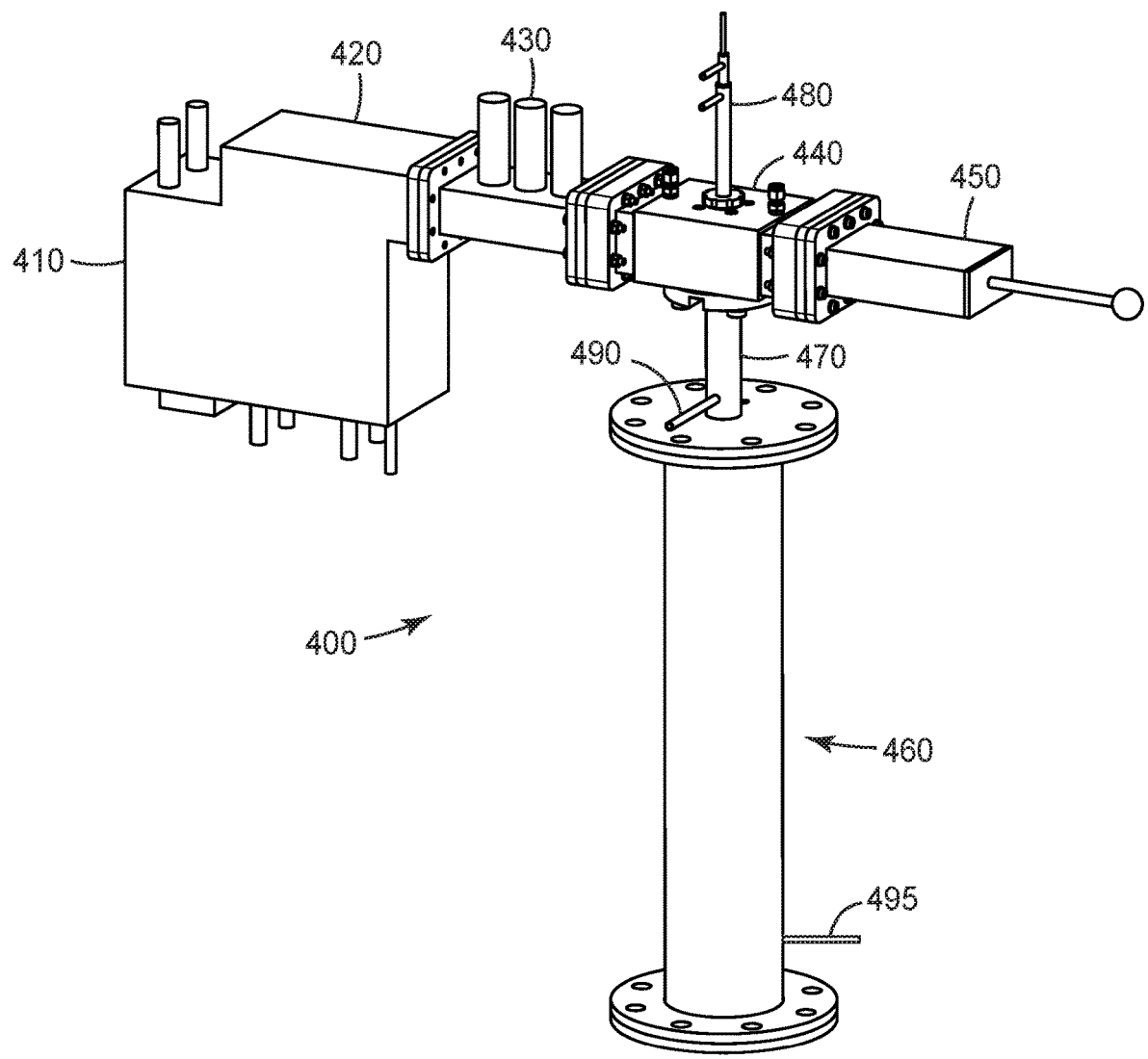
FIG. 2 illustrates an exemplary microwave reactor.

One exemplary microwave reactor 400 suitable for use as a carbon treatment reactor is shown in FIG. 2. Microwaves are generated in magnetron 410 and sent to coaxial coupler 440 via waveguide 420, and a 3-Stub tuner 430. Short-circuit slide 450 is used for a rough adjustment of the field distribution in the resonator (reaction chamber) 460. In the coaxial coupler 440, the microwaves are diverted from a rectangular waveguide into the coaxial conductor 470, which has a smaller free cross-sectional area for the conduction of the microwaves. A small cross-sectional area offers structural advantages in gas-tight separation between microwave components and the reactor. The antenna 480, which acts as an inner conductor, guides the microwaves into the resonator (reaction chamber) 460.

The microwaves heat the carbon particles in the reaction chamber 460 to the desired carbon treatment temperature, $T_C$. The reaction gas, e.g., hot effluent gases at a temperature $T_E$, are introduced through inlet port 490. These gases pass through the heated carbon bed (not shown) in reaction chamber 460. As they pass through the carbon bed, they are reacted, and the product gas stream is collected from exit port 495 for further processing.

A similar reactor design could also be used as the thermal decomposition reactor, with appropriate modifications. For example, different feed systems could be used to introduce liquid or solid fluorinated materials to be decomposed, and various microwave active particles may be used.

In some embodiments, depending on the H-content of the feed, the effluent from the thermal decomposition step contains water vapor. In some embodiments, it may be desirable to reduce the $H_2O$ content by, e.g., condensation prior to treating the effluent with the carbon. However, this will typically reduce the temperature of the effluent gas when it reaches the carbon treatment step ($T_E$), leading to a less energy-efficient process. Also, in some embodiments, it may be desirable to retain the water or even adjust the water-content of the effluent, e.g., by injecting steam. By controlling the water content during the carbon treatment step, syngas (CO/$H_2$) at a desired ratio of carbon monoxide to hydrogen can be generated providing another valuable product stream. In some embodiments, the steam can contain residual HF acids, which also provides an opportunity to recycle these acids into valuable aHF and syngas.

If the fluorinated materials contain sulfur (e.g., ionomers) or nitrogen (e.g., polyamides), $SO_2$ and $N(O)_x$ may be generated in the gaseous effluent produced in the thermal decomposition step. It may be desirable to remove or reduce the concentration of such gases to avoid contamination of the desired end products. For example, $SO_2$ can be removed by condensation and $N(O)_x$ can be removed by absorption or by application of urea or other suitable ammonia releasing compounds. To minimize contamination, in some embodiments, the total content of $SO_2$ and $N(O)_x$ is no greater than 1%, or even no greater than 0.1% by weight based of the total weight of the gas stream contacted with the carbon. Again, however, such pre-treatment steps may reduce $T_E$ resulting in a less energy-efficient process. Therefore, in some embodiments, post-treatment steps (e.g., condensation or absorption) can be used to reduce or remove such contaminants from the carbon treatment product stream.

Referring to FIG. 1, in some embodiments, a carrier gas system (not shown) may be used to introduce additional gas into the combustion chamber 320 of carbon treatment reactor 300 and to provide the desired total flow of gas through the carbon bed. Any known carrier gas system may be used. In some embodiments, inert gases (nitrogen or noble gases), oxygen and oxygen containing gases, or synthetic air could be used. In some embodiments, the oxygen content is no greater than 20 mole %, e.g., no greater than 10 or even no greater than 5 mole %.

Following the carbon treatment step, the product gas stream 120 containing HF can be condensed to capture anhydrous HF as a liquid 130. Generally, the condensing equipment 330 and processes for performing the condensing operation are known. If generated, the syngas 140 can also be separated for further use from the other remaining gases 150 (e.g., carrier gases), either before or after the anhydrous HF is recovered. Again, any known separation equipment 340 and processes for performing such operations may be used. Also, in some embodiments, some or all of the CO and $H_2$ may be separated for independent use. In some embodiments, the syngas may be used as a fuel to provide energy to one or both of the thermal decomposition reactor and the carbon treatment reactor.

EXAMPLES

The amount of and conversion to aHF in the thermal decomposition step was determined by reaction with KOH (alkali scrubber in combination with measurement of pH value) or by reaction with $CaCO_3$ (i.e., $CaCO_3 + 2 HF \rightarrow CaF_2 + CO_2 + H_2O$ ($\Delta HR^0 = -110.1$ kJ/mol) and wet chemical processing of the remaining $CaCO_3$. Here, unaffected $CaCO_3$ was dissolved in HCl and calcium chloride was washed out. Solubilities in $H_2O$: $CaF_2$ 15 mg/L (18° C.), $CaCl_2$ 740 g/L (20° C.). Amounts of aHF in a gas phase can be qualitatively detected by common HF sensors up to 10 ppm.

The amount of residual water in condensed aHF was determined by either conductivity tests using a conductivity probe for concentrated acids, available from Knick Elektronische Messgerate GmbH & Co., or by infrared spectroscopy (HF: 3962 cm$^{-1}$; $H_2O$: ca. 1595 cm$^{-1}$ and 3657 cm$^{-1}$).

The amounts of CO (0 to 60 vol. %) and $CO_2$ (0 to 100 vol. %) were quantified with an MRU-SWG300 gas analyzer. CO was detected by GC/GC-MS and IR (v: 2143 cm$^{-1}$); and $H_2$ was detected by Raman spectroscopy Ra (v: 4161 cm$^{-1}$) and using a hand detector (RKI Instruments; RKI SP-205ASC).

Three solid carbon materials were obtained as potential candidates for use in the carbon treatment step. These carbons, their sources and properties are summarized in Table 1. Mass loss was measured using thermal gravimetric analysis and differential scanning calorimetry at a heating rate of 15 K/minute under nitrogen.

TABLE 1

Carbon sources and properties.

| ID | description | source | Bulk density (g/cm³) | Mass Loss (wt. %) (maximum temperature) |
|---|---|---|---|---|
| A | Activated carbon | CarboTech DGK | 0.496 | 5% (700° C.) |
| B | Black coal | Mongolai/LS CVT | 0.775 | 40% (350° C.) |
| G | Graphite | Fluka 50870 | 0.255 | N/A |

Measurements of the penetration depth of microwaves (ε') and the ability to absorb electromagnetic energy (ε") of the three carbon materials were conducted by resonator measurements at room temperature with a frequency of 2.45 GHz. Measurements were made using a Microwave Frequency Q-meter (Typ 2) with a Split-Post Dielectric Resonator (QWED, Warsaw, Poland). The results are summarized in Table 2.

Measurements of tan δ (ε'/ε") of the carbon materials were conducted by heating with microwaves. The measurements were intended to validate rapid start-up and shutdown of the reactor, which is important for increased process reliability. The carbon material was flushed with $N_2$ (0.2 l/min) during the tests to prevent oxidation with atmospheric oxygen. The measurements took place at 2.45 GHz, whereby the power of the microwave could be varied up to 1000 W. The temperature was measured using a pyrometer (epsilon=90%) as function of time after the microwave source was switched on (heating time) and after the source was switched off (cooling time). The tan δ values are shown in Table 2.

TABLE 2

Carbon analysis results.

| ID | Description | penetration depth (ε') | tan δ (ε'/ε") |
|---|---|---|---|
| A | Activated carbon | 6 | 1 |
| B | Black coal | 2 | <0.05 |
| G | Graphite | 18 | 0.3 |

Coupling of the microwave radiation could not be observed for the Carbon-B (black coal) samples even up to a power of 1000 W. Therefore, although black coal may be suitable for other heating methods, from the point of view of heating by means of microwave radiation, black coal is considered to be less suitable.

Figure 3:
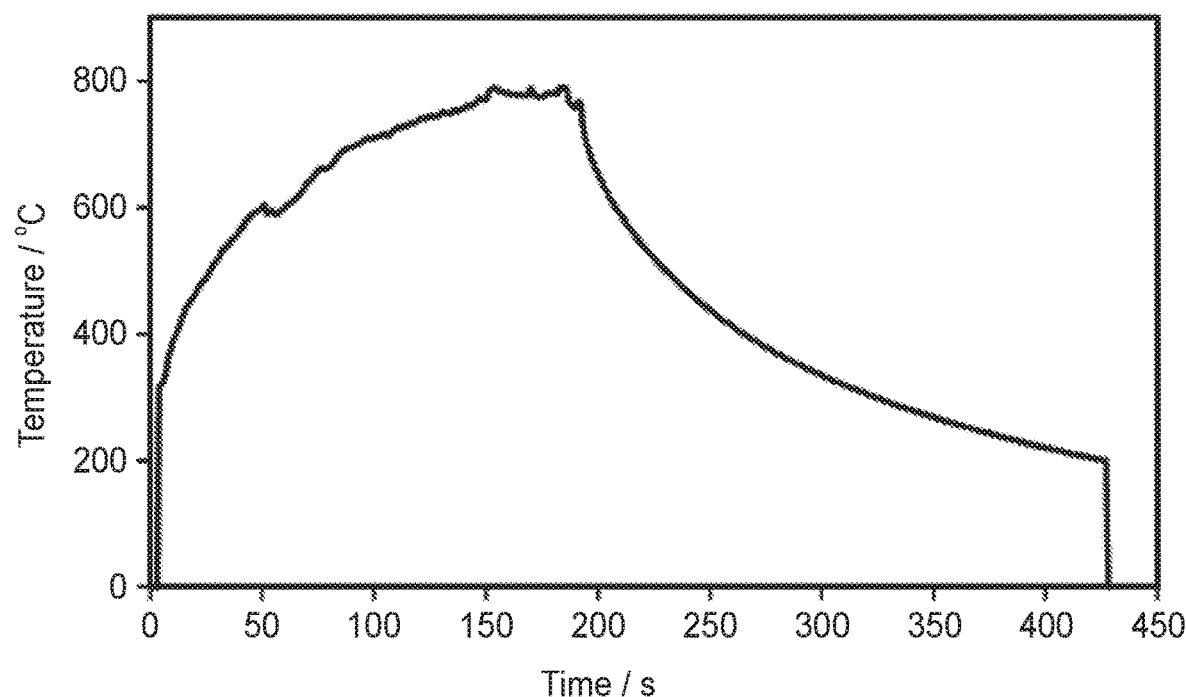
FIG. 3 shows the heating and cooling behavior of Carbon-A when exposed to microwave irradiation.
Figure 4:
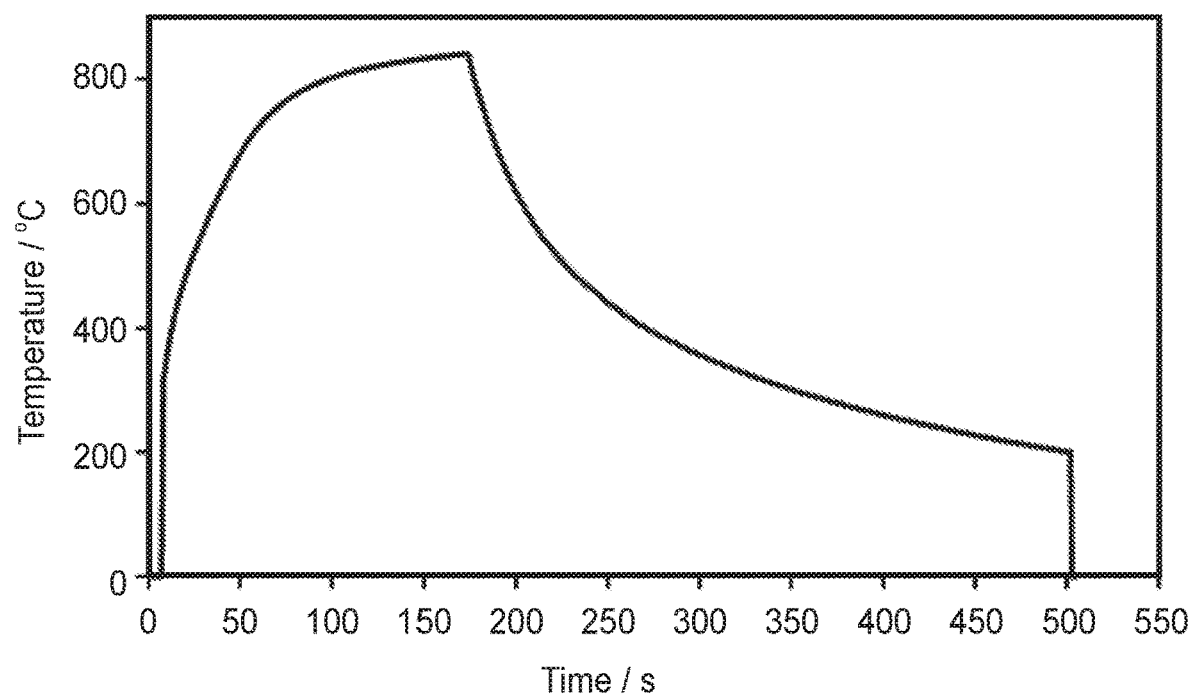
FIG. 4 shows the heating and cooling behavior of Carbon-G when exposed to microwave irradiation.

The heating and cooling behavior of Carbon-A and Carbon-G in response to electromagnetic radiation are shown in FIGS. 3 and 4. Carbon-A (the activated carbon) showed the best heating behavior, but the penetration depth of the microwave radiation was lower in comparison to Carbon-G (graphite). The graphite shows the opposite behavior, with a higher penetration depth but a lower coupling as compared to Carbon-A.

Carbon-A (activated carbon) is suitable for the microwave process, as the required process temperature of 800 to 900° C. was reached within three minutes. In addition, the activated charcoal bed in the resonator cooled down to below 200° C. within 3 to 4 minutes after switching off the microwave. Carbon-G (graphite) is also suitable, as it also quickly heats up to approx. 800° C. within three minutes and cools down to below 200° C. within four minutes.

Thermal Decomposition Step.

Sample 1. $CH_2F_2$(R-32 from Fluorchemie, Frankfurt, Germany) was thermally decomposed at a maximum flow rate of 10 mL/min to 12 mL/min in a horizontal tube reactor (pipe inside diameter 40 mm) at 800-900° C. in presence of synthetic air as carrier gas (1 L/min; oxygen content about 20%). Within four hours, 6.8 g (0.13 mol) of $CH_2F_2$ were pyrolyzed quantitatively to HF and $CO_2$. Regarding the mass balance of fluorine, a complete conversion to aHF (5.1 g, 0.26 mol) was observed. For additional verification, the isolated amount of aHF was reacted with $CaCO_3$ (250 g, 2.5 mol). In sense of the reaction $CaCO_3 + 2 HF \rightarrow CaF_2 + CO_2 +$ $H_2O$, $CaCO_3$ was partially consumed and $H_2O$ (2.5 g, 0.14 mol) as well as $CO_2$ (6.2 g, 0.14 mol) were formed.

Sample 2. Particles of 3M DYNEON ETFE 6235 (1.5 mm cut material; conveyor speed: 3 g/min) were thermally decomposed in a fluidized bed reactor in presence of synthetic air (mass flow of 3 to 6 g $O_2$/min) at 600° C. The obtained gas mixture consisted of HF and $CO_2$.

Carbon Treatment Step.

Sample 3: The effluent gases from Sample 1 ($CO_2$ and aHF) were passed through microwave stimulated graphite (Carbon-G) in the temperature range of 800 to 1400° C. Analysis of the gaseous effluent stream confirmed 100% conversion of the $CO_2$ to CO, with no change in the amount of aHF. The process was repeated with the effluent gases from Sample 2 with the same results.

Sample 4: The effluent gases from Sample 1 ($CO_2$ and aHF) were mixed with steam. The HF/$H_2O$/$CO_2$ mixture (flow rate of mixture: 0.19 to 0.27 g/min) was subsequently passed through microwave stimulated activated carbon (dwell time: 6.7 to 9.1 s) in the temperature range of 800 to 1400° C. with $N_2$ as carrier gas (max. flow rate: 0.5 to 0.7 L/min). Analysis of the gaseous effluent stream after 4.6 hours showed a full conversion of $CO_2$ to CO and $H_2O$ to $H_2$ and CO. The aHF was not affected and could be condensed and recovered. The process was repeated with the effluent gases from Sample 2 with the same results.

What is claimed is:

1. A method of generating anhydrous hydrogen fluoride comprising
   (i) thermally decomposing a fluorinated material into a gaseous effluent comprising hydrogen fluoride (HF) and carbon dioxide ($CO_2$), and
   (ii) contacting the gaseous effluent with carbon at a temperature, $T_C$, of at least 830° C. to convert the carbon dioxide to carbon monoxide (CO) and produce a gaseous product comprising the hydrogen fluoride and carbon monoxide, wherein, if the gaseous product further comprises carbon dioxide, a molar ratio of carbon dioxide to carbon monoxide is no greater than 0.05; and
   (iii) condensing the hydrogen fluoride from the gaseous product to form liquid anhydrous hydrogen fluoride.

2. The method of claim 1, wherein $T_C$ is at least 1000° C.

3. The method of claim 1, wherein the molar ratio of carbon dioxide to carbon monoxide is no greater than 0.01.

4. The method of claim 1, wherein the carbon comprises activated carbon or graphite.

5. The method of claim 1, further comprising using microwave radiation to heat the carbon to the temperature $T_C$.

6. The method of claim 1, wherein, when contacting the gaseous effluent with carbon at a temperature, $T_C$, the gaseous effluent further comprises water vapor ($H_2O$) and contacting the gaseous effluent with carbon at a temperature, $T_C$, converts at least 99 wt. % of the $H_2O$ to hydrogen ($H_2$) and carbon monoxide (CO).

7. The method of claim 6, further comprising adding $H_2O$ to the gaseous effluent before or while contacting the gaseous effluent with carbon at a temperature, $T_C$.

8. The method of claim 6, further comprising collecting the hydrogen and carbon monoxide from the gaseous product as syngas.

9. The method of claim 6, further comprising separating the hydrogen and carbon monoxide.

10. The method of claim 1, wherein the fluorinated material is thermally decomposed at a temperature, $T_D$, of at least 500° C.

11. The method of claim 1, wherein a temperature of the gaseous effluent contacting the carbon, $T_E$, is at least 300° C.

12. The method of claim 11, wherein $T_D$ is at least 800° C. and $T_E$ is at least 500° C.

13. The method of claim 1, wherein the fluorinated material comprises one or more fluorinated polymers.

14. The method of claim 13, wherein at least one fluorinated polymer is a perfluorinated polymer.

15. The method of claim 13, wherein thermally decomposing the fluorinated material comprises subjecting the fluorinated material to microwave irradiation in the presence of microwave active particles.

16. The method of claim 1, wherein the liquid anhydrous hydrogen fluoride has a water content of less than 1000 ppm by weight.

* * * * *